(12) United States Patent
Burley et al.

(10) Patent No.: US 11,286,540 B2
(45) Date of Patent: Mar. 29, 2022

(54) METHOD OF PROCESSING A PYRITE-CONTAINING SLURRY

(71) Applicant: Rio Tinto Technological Resources Inc., South Jordan, UT (US)

(72) Inventors: Adam James Burley, London (GB); Javiera del Pilar Alcayaga Zuñiga, Santiago (CL); Yure Anton Mladinic Muñoz, Santiago (CL)

(73) Assignee: Rio Tinto Technological Resources Inc., South Jordan, UT (US)

( * ) Notice: Subject to any disclaimer, the term of this patent is extended or adjusted under 35 U.S.C. 154(b) by 0 days.

(21) Appl. No.: 16/944,379

(22) Filed: Jul. 31, 2020

(65) Prior Publication Data

US 2022/0033932 A1    Feb. 3, 2022

(51) Int. Cl.
| | |
|---|---|
| *C22B 15/00* | (2006.01) |
| *C22B 3/06* | (2006.01) |
| *C22B 1/14* | (2006.01) |
| *C22B 1/00* | (2006.01) |

(52) U.S. Cl.
CPC .......... *C22B 15/0067* (2013.01); *C22B 1/005* (2013.01); *C22B 1/14* (2013.01); *C22B 3/06* (2013.01)

(58) Field of Classification Search
CPC ......... C22B 15/0067; C22B 1/00; C22B 1/05; C22B 3/06; C22B 3/08; C22B 15/0071; C22B 1/14; C22B 1/16; C22B 3/18; B03D 1/02; B03D 1/06; B03D 1/082; B03D 2203/02
See application file for complete search history.

(56) References Cited

U.S. PATENT DOCUMENTS

| | | | | |
|---|---|---|---|---|
| 3,753,691 | A | * | 8/1973 | Grover ................ C22B 15/0063 75/424 |
| 4,060,464 | A | | 11/1977 | Fahlstrom et al. |
| 5,171,428 | A | | 12/1992 | Beattie et al. |
| 5,232,490 | A | * | 8/1993 | Bender ................... C22B 11/04 75/733 |
| 5,316,751 | A | * | 5/1994 | Kingsley ................... C22B 3/18 423/571 |

(Continued)

FOREIGN PATENT DOCUMENTS

| | | |
|---|---|---|
| CA | 2374509 A1 | 11/2000 |
| PE | 20010310 A1 | 3/2001 |
| PE | 20140641 A1 | 6/2014 |

OTHER PUBLICATIONS

Uhrie, John L., "Pyrite as a stockpile leach-aid", Proceedings of Copper 99-Cobre 99 International Conference, vol. IV—Hydrometallurgy of Copper, The Minerals, Metals & Materials Society (1999), pp. 481-490.

(Continued)

*Primary Examiner* — Steven J Bos
(74) *Attorney, Agent, or Firm* — Banner & Witcoff, Ltd.

(57) ABSTRACT

A method of processing a pyrite-containing slurry including removing pyrite from the pyrite-containing slurry and forming (i) an inert stream and (ii) a pyrite-containing material. Using the pyrite-containing material in a downstream leach step in which pyrite in the pyrite-containing material generates acid and heat that facilitates leaching a metal, such as copper or nickel or zinc or cobalt, from a metal-containing material.

15 Claims, 1 Drawing Sheet

(56) References Cited

U.S. PATENT DOCUMENTS

| | | |
|---|---|---|
| 6,482,373 B1 | 11/2002 | Hannaford et al. |
| 6,926,753 B2 | 8/2005 | Faine et al. |
| 7,491,372 B2 | 2/2009 | Faine et al. |
| 7,575,622 B2 | 8/2009 | Crundwell et al. |
| 7,799,295 B2 * | 9/2010 | Dreisinger .......... C22B 15/0071 423/41 |
| 7,846,233 B2 | 12/2010 | Dixon et al. |
| 8,012,238 B2 | 9/2011 | Kohr |
| 8,252,086 B2 | 8/2012 | Seed et al. |
| 8,273,237 B2 | 9/2012 | Marsden et al. |
| 8,277,539 B2 | 10/2012 | Dixon et al. |
| 8,388,728 B2 | 3/2013 | Hollitt et al. |
| 8,491,701 B2 | 7/2013 | Uhrie et al. |
| 8,821,613 B2 | 9/2014 | Ji et al. |
| 9,346,062 B2 | 5/2016 | Gorain |
| 10,323,296 B2 | 6/2019 | Ponce Beoutis et al. |
| 10,526,681 B2 | 1/2020 | Chaiko et al. |
| 2002/0194963 A1 | 12/2002 | Kohr |
| 2009/0019970 A1 | 1/2009 | Ritchie et al. |
| 2009/0293680 A1 | 12/2009 | Ritchie et al. |
| 2011/0150729 A1 * | 6/2011 | Liu ........................... C22B 3/42 423/139 |
| 2014/0127789 A1 | 5/2014 | Fitzmaurice et al. |
| 2015/0027901 A1 * | 1/2015 | Theodore .................. C25C 1/12 205/560 |
| 2015/0225809 A1 * | 8/2015 | Robertson ................. C22B 3/18 423/1 |
| 2016/0138128 A1 * | 5/2016 | Nicolay .............. C22B 15/0071 435/262 |

OTHER PUBLICATIONS

International Search Report and Written Opinion for PCT/US2021/043869, dated Dec. 30, 2021, 21 pages.
International Search Report and Written Opinion for PCT/US2021/043878, dated Dec. 30, 2021, 20 pages.

* cited by examiner

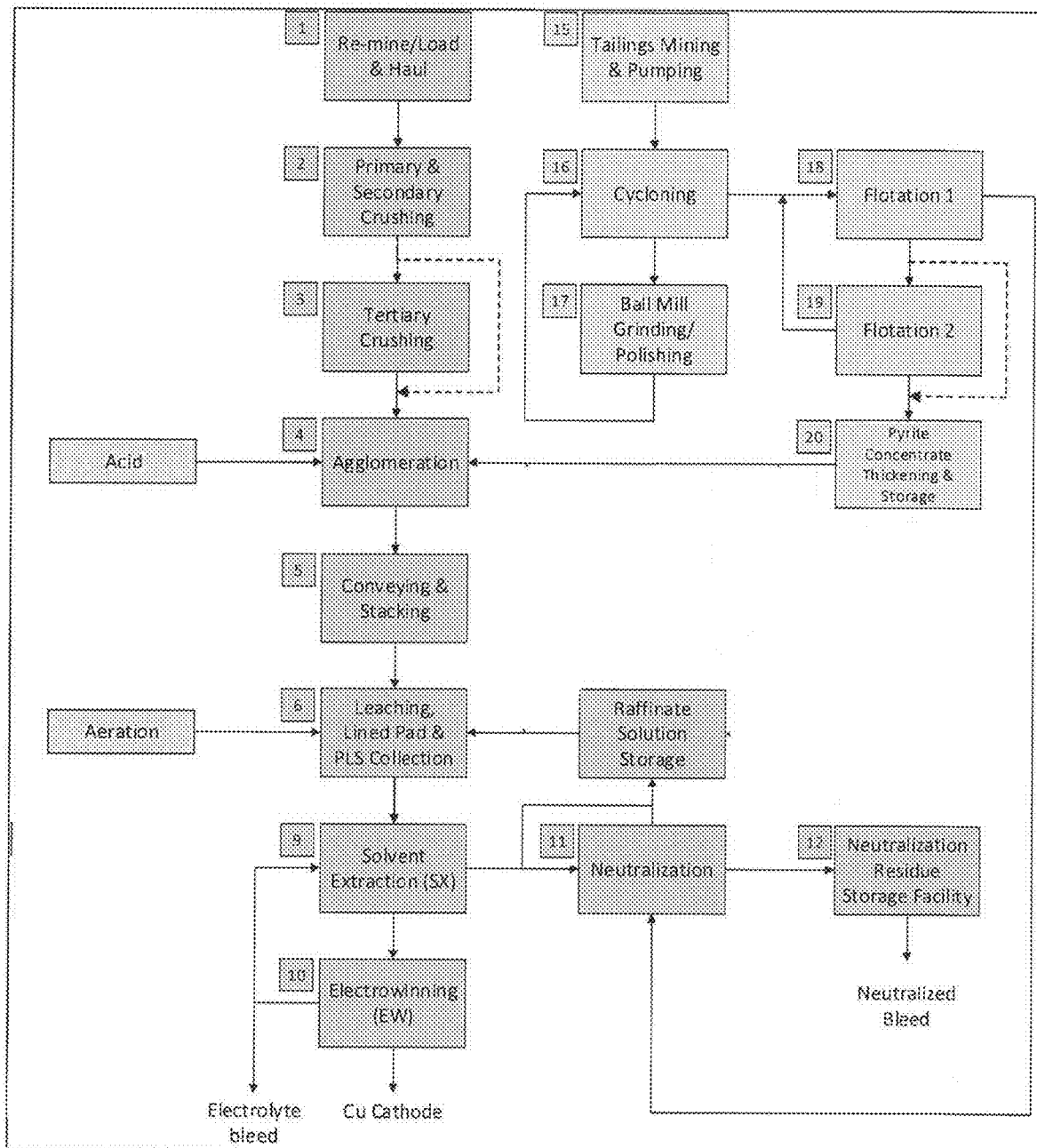

METHOD OF PROCESSING A PYRITE-CONTAINING SLURRY

TECHNICAL FIELD

The present invention relates to a method of processing, for example by beneficiating, a pyrite-containing slurry.

The present invention relates particularly, although by no means exclusively, to a method of processing, for example by beneficiating, a pyrite-containing slurry, by removing pyrite from the slurry and using the removed pyrite in downstream method steps.

The present invention relates particularly, although by no means exclusively, to a method of processing, for example by beneficiating, a pyrite-containing slurry in the form of tailings by removing pyrite from the tailings and using the removed pyrite in downstream method steps.

The present invention also relates to a heap leaching method that is characterized by leaching a heap of agglomerates produced at least in part from a pyrite-containing material.

The present invention also relates to a heap that is characterized by the heap containing agglomerates produced at least in part from a pyrite-containing material.

BACKGROUND ART

The technical field of the invention described above is relevant to the production of a metal, such as copper or nickel or zinc or cobalt.

The following description of the invention focuses on copper as one example of a metal.

Copper is an increasingly important metal for the transition to a low carbon-based global economy.

Current wet processing plants for recovering copper from copper-containing ores and concentrates, such as flotation circuits, typically produce large volumes of tailings in the form of aqueous slurries of particulates, typically fines but may include coarse particles, containing small concentrations of copper.

Tailings are typically stored in dams. Typically, the dams are substantial in size and the dam capacity increases as mining continues.

Tailings and tailings dams often present significant environmental and safety risks during the lives of mines.

There are substantial issues involved in maintaining tailings dams during the lives of mines and remediating tailings dams at the end of the lives of mines. The suspended solids take time, often considerable time, to settle to facilitate safe disposal of the solids. In addition, there are potential issues with structural integrity of tailings dams. There are known de-watering technologies for reducing the volumes of tailings, but these technologies add cost and complexity to mining operations.

From time to time, there are catastrophic collapses of tailings dams that have caused loss of life and considerable damage to areas downstream of the dams.

Also, there are concerns about mines taking the necessary steps to ensure the structural integrity of dam walls to minimize the risk of collapse.

Also, tailings often contain contaminants, either directly or via reactions, which present challenges for mine remediation.

For example, tailings often contain considerable concentrations of pyrite, which poses a potential environmental hazard because the tailings can oxidize to produce an acidic effluent that requires treatment, for example, by neutralizing the acidity, before the tailings can be discharged.

It is important to note that removal of contaminants is not an answer if the cost is prohibitive and/or the contaminants, once removed from tailings, remain as contaminants, albeit in another medium that has to be stored/contained in some way.

Therefore, contaminants such as pyrite, add a layer of complexity to processing tailings.

The invention provides a method that makes it possible to process the pyrite-containing tailings beneficially.

The above description and the following description focus on tailings from wet processing plants for copper-containing ores. The invention also extends to tailings derived from processing ores containing other metals, such as cobalt, nickel and zinc.

The above description is not an admission of the common general knowledge in Australia or elsewhere.

SUMMARY OF THE DISCLOSURE

The invention is based on a realization that it is possible to remove pyrite from a pyrite-containing slurry, such as pyrite-containing tailings, and to use the pyrite to contribute to removing a metal, such as copper or nickel or zinc or cobalt, from a metal-containing material in a way that takes advantage of the acid and heat-generation capacity of pyrite and in so doing also reduces the environmental impact of pyrite.

Therefore, the invention is more than removing pyrite from one waste stream, namely a pyrite-containing slurry. The invention does this and therefore improves the pyrite-containing slurry from an environmental perspective. However, the invention also processes the pyrite removed from the slurry in a way that reduces the net environmental impact of the pyrite.

In broad terms the invention provides a method of processing, for example by beneficiating, a pyrite-containing slurry, such as tailings, that comprises:

(a) removing pyrite from the slurry and forming an inert stream as described herein and a pyrite-containing material; and (b) using the pyrite-containing material in a downstream leach step in which pyrite in the pyrite-containing material generates acid and heat that facilitates leaching a metal, such as copper or nickel or zinc or cobalt, from a metal-containing material, such as a mined material, such as an ore.

The term "inert" as used herein in relation to an inert stream is understood to mean that the stream is less reactive than the input slurry to the method in terms of the amount of pyrite in the stream.

The term "pyrite-containing slurry" as used herein is understood to mean any slurry that contains pyrite in amounts that present an environmental hazard if untreated/unmanaged.

The above-described method has the following advantages:

The method makes it possible to process tailings that contain pyrite and thereby reduce the volumes of existing tailings dams. This is an important environmental outcome, typically involving minimal use of resources.

The removal of pyrite from a pyrite-containing slurry, such as tailings, in accordance with the invention produces two "products", which are useful as a consequence of the invention.

One product is an inert stream. As defined above, "inert" means that the stream is less reactive than the input slurry to the method in terms of the amount of pyrite in the inert stream. This is beneficial because pyrite in tailings is an environmental problem because pyrite makes the tailings "acid generating" and this is an issue for disposal of the tailings. The method provides an opportunity to produce an output that is environmentally safe for use in downstream applications, such as in copper or nickel or zinc or cobalt ore processing plants (in the case of an aqueous portion of the inert stream) and as ground cover/fill material (in the case of a solid portion of the inert stream). With regard to the ground cover/fill material opportunity, this is possible in view of the reduction or substantial elimination altogether of the capacity of the solid portion to generate acidic drainage.

The second product is a pyrite-containing material that is used beneficially as a source of pyrite in downstream method steps of the invention and, as a consequence, minimises the adverse environmental impact of pyrite. For example, the pyrite-containing material of the second product can be used beneficially in method steps for recovering a metal, such as copper or nickel or zinc or cobalt, from a metal-containing material, such as via heap leaching of a metal-containing rock, for example waste rock, such as low-grade metal-containing rock, such as a low-grade copper-containing rock. In this regard, the acid and heat generating capacity of pyrite is an advantage in heap leaching. For example, pyrite can reduce the amount of added acid that is required in the leach liquor. In addition, pyrite oxidation is a highly exothermic reaction and the heat that is generated enables elevated temperature leaching which results in more rapid and complete extraction of metals during heap leaching. It is noted that any metal, such as copper or nickel or zinc or cobalt, in the pyrite-containing material is a bonus—it is taken into the heap with pyrite and can be recovered in the heap leaching step.

The method can be operated with readily-available and tried and tested equipment.

The method makes it possible to process what has been previously classified as waste materials, such as tailings and waste rock, and reduce the environmental impact of these materials as well as optimising the recovery of value from the originally-mined material.

The tailings may be any suitable tailings that contain pyrite-containing material.

The tailings may be from a tailings dam.

The tailings may be sourced directly from a tailings stream of an ore processing plant.

The tailings may be processed, for example beneficiated, by any method that recovers pyrite from the tailings.

The tailings may be processed, for example beneficiated, by any method that recovers and concentrates pyrite from the tailings.

The pyrite removal step (a) may include a size separation step, such as via cyclones or other suitable classification devices, that for example separates larger particles from the remaining fines-containing tailings.

The term "cyclone" is understood herein to describe a device that can classify, separate or sort particles in a liquid suspension based on the ratio of their centripetal force to fluid resistance. This ratio is high for dense (where separation by density is required) and coarse (where separation by size is required) particles, and low for light and fine particles.

The pyrite removal step (a) may include reducing the size of the larger particles in a size reduction circuit and returning the reduced-sized particles to the size separation step.

The pyrite removal step (a) may include selecting the operating conditions for the size separation step so that pyrite particles in the pyrite-containing material in the remaining tailings have a required particle size distribution for downstream processing of the tailings.

The pyrite removal step (a) may include floating pyrite-containing particles in the remaining tailings and producing (i) the inert stream and (ii) a pyrite-containing material stream, such as a pyrite-containing concentrate stream.

The pyrite removal step (a) may include thickening and/or filtering the pyrite-containing material stream and de-watering the material and forming a pyrite-containing concentrate.

The method may include any suitable downstream processing steps for the inert stream produced in the pyrite removal step (a).

The processing steps may include using an aqueous portion of the inert stream as a source of water in processing plants for recovering copper or nickel or zinc or cobalt from ores containing at least one of these metals.

A solid portion of the inert stream may be used as cover/fill material to cap tailings dams and to generally fill voids, for example, voids in waste rock dumps by mixing the tailings with the waste rock prior to disposal.

The solid portion may also be used in construction materials such as to make concrete or bricks.

Also, the solid portion may also be used to sequester $CO_2$ from the atmosphere as carbonate minerals.

The downstream method, i.e. leach, step (b) may include any suitable leach step that leaches a metal, such as copper or nickel or zinc or cobalt, from the metal-containing material.

By way of example, when the metal is copper, the downstream method step (b) may include leaching copper from a copper-containing material with a leach liquor, with pyrite in the pyrite-containing material stream generating acid that facilitates leaching copper from the copper-containing material.

Typically, pyrite is 1-10 wt. % of the total mass of the copper-containing material and the pyrite-containing material.

By way of example, the downstream method step (b) may mix together the pyrite-containing material and the copper-containing material and leaching copper from the copper-containing material with a leach liquor, with pyrite in the pyrite-containing material stream generating acid and heat that facilitates leaching copper from the copper-containing material.

By way of example, the downstream method step (b) may include:
  i. mixing the pyrite-containing material and the copper-containing material and forming agglomerates;
  ii. heap leaching copper from a heap of the agglomerates and producing a pregnant leach liquor; and
  iii. recovering copper from the pregnant leach liquor.

The pyrite particles in the pyrite-containing material may have a particle size of $P_{80}$ of ≤1 mm.

The pyrite particles in the pyrite-containing material may have a particle size of $P_{80}$ of ≤250 μm.

The agglomeration step (i) may be any suitable step for agglomerating the pyrite-containing material and the copper-containing material.

The agglomeration step (i) may include mixing and agglomerating the pyrite-containing material and the copper-containing material.

The mixing step may be carried out before the agglomerating step.

The mixing and the agglomerating steps may be carried out simultaneously.

The copper-containing material may be any suitable copper-containing material.

One example of the copper-containing material is rock that contains low concentrations of copper and, for example, may be regarded as waste rock.

The copper-containing material may be in the form of waste stockpiles of copper-containing material having low grades, i.e. low concentrations, of copper in the material.

In other words, the copper-containing material may be from stockpiles that are considered to be too low in grade to be economically processed in flotation and other wet processing systems for recovering copper from copper-containing ores and concentrates.

More particularly, the copper-containing material may be from stockpiles that are too low-grade to be economically processed by any other processing method, including heap leaching.

The invention also provides a heap leaching method for a mined material that contains a metal, such as copper or nickel or zinc or cobalt, that is characterized by:
(a) leaching a heap of agglomerates produced from (i) a pyrite-containing material produced from a pyrite-containing slurry, such as pyrite-containing tailings, and (ii) the mined material, such as waste rock, with a leach liquor, with the pyrite in the pyrite-containing material generating acid and heat that facilitates leaching metal from the mined material; and
(b) collecting a pregnant leach liquor containing the metal in solution from the heap.

The invention also provides a heap that leaches a metal, such as copper or nickel or zinc or cobalt, from a mined material, the heap comprising:
(a) a heap of agglomerates produced from (i) a pyrite-containing material produced from a pyrite-containing slurry, such as pyrite-containing tailings, and (ii) the mined material, such as waste rock; and
(b) a system that (i) supplies a leach liquor to the heap so that the leach liquor flows downwardly though the heap and leaches the metal from the mined material and (ii) collects a pregnant leach liquor containing the metal in solution from the heap, with the pyrite generating acid and heat in the heap that facilitates leaching metal from the mined material.

The pyrite may be 1-10 wt. % of the total mass of the agglomerates.

BRIEF DESCRIPTION OF THE DRAWING

The invention is described further below by way of example only with reference to FIG. 1 which is a flow sheet of one embodiment of a method of processing, for example by beneficiating, pyrite-containing tailings and using the pyrite removed from the tailings in downstream heap leaching of a copper-containing material.

DESCRIPTION OF EMBODIMENT

The embodiment of the method of processing, for example by beneficiating, a pyrite-containing slurry in the form of tailings in accordance with the invention shown in FIG. 1 removes pyrite from the tailings and produces an inert stream that is suitable for use in downstream applications and a pyrite-containing material that is used beneficially, as described below, in downstream heap leaching of a copper-containing material and, as a consequence, minimizes the adverse environmental impact of pyrite.

In other words, the embodiment produces two "products" from the pyrite-containing tailings.

It is understood that the invention is not confined to this embodiment and extends generally to a method of processing, for example by beneficiating, a pyrite-containing slurry that comprises removing pyrite from the slurry and forming two "products" in the form of (a) an inert stream and (b) a pyrite-containing material, typically a solid material, such as a solid concentrate.

In general terms with reference to FIG. 1, the embodiment of the method includes the following steps:
(a) separation steps 15, 16, 17, 18, 19, 20 that process pyrite-containing tailings and produce two "products" in the form of (i) a solid pyrite-containing concentrate stream and (a) an inert stream from the tailings;
(b) agglomeration step 4 that mixes and agglomerates (i) the pyrite-containing concentrate stream 20 from the separation steps and (ii) at least one copper-containing solid material that has been processed in steps 1, 2, 3;
(c) a heap leach step 6 that leaches copper from a heap of the agglomerates produced in the agglomeration step and produces a pregnant leach liquor; and
(d) copper recovery steps 9, 10 that recover copper from pregnant leach liquor from the heap.

Separation Steps 15, 16, 17, 18, 19, 20 for Pyrite-Containing Tailings

Typically, the solids in the tailings are in the form of a slurry of (a) fines, with low concentrations of copper, typically less than 0.4 wt. %, more typically less than 0.3 wt. %, and (b) pyrite suspended in water. Typically, these fines are slow to settle.

The tailings are transferred, for example by being pumped, from a tailings dam or other suitable source of tailings 15 to a series of cyclones 16 or any other suitable size separation option that separates larger solids from the remaining fines-containing tailings and forms two separate streams.

The cyclones 16 may be any suitable cyclones.

The larger solids from the cyclones 16 are processed in a size reduction circuit, such as a milling/grinding/polishing circuit 17, that reduces the particle sizes of the larger solids.

The output of this circuit is returned to the cyclones 16 for further processing in the cyclones.

The operating conditions of the cyclones 16 are selected so that the pyrite particles in the remaining tailings have a required particle size distribution for the heap leach step 5. In this regard, typically pyrite particles have a particle size of $P_{80}$ of ≤1 mm. More typically, pyrite particles have a particle size of $P_{80}$ of ≤250 µm.

The remaining tailings from the cyclones 16 are transferred to a $1^{st}$ flotation circuit 18 and are processed in the circuit. Suitable flotation reagents are added to the circuit as required. The operating conditions, including reagents, are selected to float pyrite-containing particles. Typically, these operating conditions will also float copper particles.

The underflow from the $1^{st}$ flotation circuit forms the abovementioned inert stream. As noted above, the term "inert" means that the stream is less reactive than the input slurry to the method in terms of the amount of pyrite in the stream. In the context of FIG. 1, this means that the underflow stream is less reactive than the pyrite-containing tailings supplied to the method in terms of the amount of pyrite in the stream. As noted above, this is beneficial because pyrite in tailings is an environmental problem because pyrite makes the tailings "acid generating tailings" and this is an issue for disposal of the tailings. The method provides an opportunity to produce an output that is environmentally safe for use in downstream applications, such as in copper ore processing plants, and can reduce the oxidant (ferric iron) requirements. The ferric iron (produced by microbial oxidation of the ferrous iron that dissolves from the pyrite concentrate and iron-bearing minerals in the waste rock) oxidizes the pyrite and the copper sulfide minerals. In the embodiment of FIG. 1, the underflow stream for the $1^{st}$ flotation circuit is transferred to a downstream neuralization step 11 described below.

The overflow, i.e. floated, stream from the $1^{st}$ flotation circuit is transferred to and processed in a $2^{nd}$ flotation circuit 19.

Suitable flotation reagents are added to the $2^{nd}$ flotation circuit 19 as required. The operating conditions, including reagents are selected to float pyrite-containing particles.

The underflow from the $2^{nd}$ flotation circuit is transferred back to the $1^{st}$ flotation circuit.

The pyrite-containing overflow from the $2^{nd}$ flotation circuit is transferred to thickeners 20 and de-watered and forms a pyrite-containing concentrate.

The pyrite-containing concentrate is transferred to the agglomeration step 4 described below.

It is noted that, whilst this embodiment of the method of the invention has two flotation circuits 18, 19, the invention is not confined to this number of circuits.

Agglomeration Step 4

The agglomeration step 4 agglomerates:
(a) the tailings-derived pyrite-containing concentrate described above; and
(b) a copper-containing material.

The copper-containing material in this embodiment of the method of the invention includes copper-containing waste rock and is discussed in the following section.

It is noted that the copper-containing material may be any suitable copper-containing material having regard to the characteristics, such as particle size distribution, of the tailings-derived concentrate and the requirements for downstream processing of the agglomerates.

The agglomeration step 4 may be any suitable agglomeration step using any suitable apparatus, such as agglomeration drums.

By way of example, required ratios of the pyrite-containing concentrate and the copper-containing material are added to a mixing device and are mixed together, with or without a binder, with or without an acid, and with or without added water, and with or without recycled leach solution. The required ratios depend on factors such as the amount of pyrite in the rock. Typically, a broad pyrite concentration range for the mixed product is 1-10 wt. % pyrite.

The selection of the binder and the acid and the addition of water and/or recycled leaching solution are a function of a number of factors, including the characteristics of the pyrite/copper-containing concentrate and the copper-containing feed materials and the required mechanical properties of the agglomerates.

The agglomeration step 4 may include any suitable protocol for adding and mixing the copper-containing solid feed materials and the binder and water, if required.

Processing the Copper-Containing Material Steps—1, 2, 3

In the flow sheet shown in FIG. 1, the copper-containing material is in the form of waste rock having low grades of copper that has been re-mined from stockpiles 1.

As noted above, currently, these stockpiles are considered too low-grade to be economically processed in flotation and other ore processing systems for recovering copper from copper-containing ores and concentrates.

As noted above, the invention is not confined to this source of copper-containing material.

The stockpiled waste rock 1 is transported in suitable vehicles, such as haul trucks or front-end loaders, or on conveyor belts to comminution circuits and crushed and milled in primary, secondary and tertiary comminution circuits 2, 3 to the extent required to produce a suitable particle size distribution for the agglomeration step 4.

The comminution circuits 2, 3 may include single or multiple crushing steps delivering crushed copper-containing material to single or multiple milling and sizing steps to produce the comminution product stream having a desired particle size distribution for the agglomeration step 4.

The crushing steps 2, 3 may be carried out using a combination of gyratory, cone and high pressure grinding roll (HPGR) crushers (not shown in the Figures).

The agglomerates are stored in a stack 5 and transferred to the heap leach steps described below.

Heap leach, downstream solvent extraction, and electrowinning steps 5, 6, 9, 10, 11, 12

The agglomerates are stored in a stack 5 and are conveyed from the stack 5 and formed into a heap 6 of agglomerates on a leach pad.

The heap 6 is provided with:
(a) a leach liquor storage and delivery system to supply leach liquor to an upper surface of the heap;
(b) a pregnant leach liquor collection system for collecting leach liquor containing copper in solution that is extracted from agglomerates in the heap; and
(c) optionally, microbes (bacteria and archaea) to oxidise ferrous iron to ferric iron, with the ferric iron being an oxidant in the leaching process.

The pregnant leach liquor is processed in a solvent extraction system 9 that extracts copper from the liquor in an organic medium and then strips copper from the organic medium and produces a copper-containing solution.

The copper-containing solution is transferred to an electrowinning plant 10 and copper is recovered from solution.

The raffinate from the solvent extraction system 9 is regenerated and returned to the heap as leach liquor. The leach liquor regeneration system includes a raffinate bleed limestone/lime neutralization step 11 to control the build-up of impurities, generating neutralized solids for separate impoundment in a neutralization residue storage facility 12 or possibly co-impoundment with tailings.

The pyrite-containing concentrate in the agglomerates provides valuable sources of acid and heat via the pyrite.

The acid-generating properties of the pyrite mean that the amounts of acid that have to be added to the leach liquor can be reduced to maintain a given leaching acid requirement.

In addition, when microbes are present, the microbial oxidation of pyrite produces acid and heat, all of which are beneficial for heap leaching the copper containing material.

ADVANTAGES OF THE EMBODIMENT SHOWN IN FIG. 1

The advantages of the above-described embodiment shown in FIG. 1, and the invention generally, include the following advantages:

The embodiment makes it possible to produce two output "products" from pyrite-containing tailings.

One product is an inert stream.

The second product is a pyrite concentrate that can be used beneficially in a downstream heap leaching method for a copper-containing material. In this application, the primary focus is on the beneficial use of pyrite to generate acid and heat in a heap to reduce the added acid requirements for heap leaching and to generate elevated temperatures which increase the rate and extent of copper extraction from the copper containing material.

The embodiment makes it possible to reduce the environmental impact of pyrite-containing tailings and to use at least the extracted pyrite beneficially.

The embodiment makes it possible to optimise the recovery of copper from a mined material at low cost, with minimal environmental impact and minimal use of resources.

The embodiment uses readily-available and tried and tested equipment.

Many modifications may be made to the flow sheet of FIG. 1 without departing from the spirit and scope of the invention.

Many modifications may be made to the embodiment of the invention described above without departing from the spirit and scope of the invention.

By way of example, whilst the embodiment includes a "cycloning" step 16, the invention extends to the use of any suitable size separation step.

In addition, whilst the embodiment includes steps 1-3 to process waste rock to form the copper-containing material that is one feed for the agglomeration step 4, the invention is not confined to this combination of steps and the waste rock may be processed in any suitable steps to produce a suitable feed material for the agglomeration step 4.

In addition, whilst the embodiment is described in the context of recovering copper, it is noted that the invention is not confined to copper and extends to recovering metals such as nickel or zinc or cobalt from waste rock containing at least one of these metals.

In addition, whilst the embodiment focuses on tailings from wet processing plants for copper-containing ores, the invention also extends to tailings derived from processing ores containing other metals, such as cobalt, nickel and zinc.

The invention claimed is:

1. A method of removing copper from a low-grade copper-containing material having copper sulfide minerals comprising
   (a) obtaining a pyrite-containing slurry from a tailings dam or directly from a tailings stream of an ore processing plant;
   (b) removing pyrite from the pyrite-containing slurry by floating pyrite-containing particles and forming
      (i) an inert stream and
      (ii) a pyrite-containing material including pyrite-containing particles;
   (c) mixing a low-grade copper-containing material having copper sulfide minerals with the pyrite-containing material and forming agglomerates, and
   (d) leaching copper from the copper-containing material in the agglomerates from step (c) with a leach liquor and microbes,
      wherein the pyrite in the pyrite-containing material generates acid and heat that facilitates leaching copper from the copper-containing material, and
      wherein the microbes oxidize ferrous iron to ferric iron.

2. The method defined in claim 1 wherein the pyrite removing step (b) includes a size separation step which separates larger particles from the pyrite-containing slurry before removing pyrite from the pyrite-containing slurry.

3. The method defined in claim 2 wherein the pyrite removing step (b) includes reducing the size of the larger particles in a size reduction circuit and returning the reduced-sized particles to the size separation step.

4. The method defined in claim 3 wherein the pyrite removing step (b) includes selecting operating conditions so that pyrite particles in the pyrite-containing material have a required particle size distribution for the leaching step (d).

5. The method defined in claim 4 wherein the pyrite particles in the pyrite-containing material have a particle size of $P_{80}$ of $\leq 1$ mm.

6. The method defined in claim 4 wherein the pyrite particles in the pyrite-containing material have a particle size of $P_{80}$ of $\leq 250$ μm.

7. The method defined in claim 1 wherein the pyrite removing step (a) includes thickening and/or filtering the pyrite-containing material and de-watering the pyrite-containing slurry and forming a pyrite-containing concentrate.

8. The method defined in claim 1 includes using the inert stream as a source of water in processing plants for recovering metal from the copper-containing material.

9. The method defined in claim 1 wherein pyrite is 1-10 wt. % of the total mass of the copper-containing material and the pyrite-containing material.

10. The method defined in claim 1 wherein the leaching in step (d) includes:
    i. heap leaching copper from a heap of the agglomerates and producing a pregnant leach liquor contain copper in solution; and
    ii. recovering copper from the pregnant leach liquor.

11. The method defined in claim 10 wherein the low-grade copper containing material includes rock.

12. The method defined in claim 1 wherein the microbes are bacteria and archaea.

13. The method of claim 2 wherein the inert stream is a source of water for recovering metal from the copper-containing material.

14. A method of removing copper from a low-grade copper-containing material having copper sulfide minerals comprising:
    (a) obtaining a pyrite-containing slurry from a tailings dam or directly from a tailings stream of an ore processing plant;
    (b) removing pyrite from the pyrite-containing slurry by floating pyrite-containing particles and forming (i) an inert stream and (ii) a pyrite-containing material that includes pyrite-containing particles, including selecting operating conditions so that pyrite particles have a required particle size distribution for leaching step (d);
    (c) mixing a low-grade copper-containing material having copper sulfide minerals with the pyrite-containing material and forming agglomerates, and
    (d) leaching copper from the copper-containing material in the agglomerates from step (c) with a leach liquor and microbes,
       wherein the pyrite in the pyrite-containing material generates acid and heat that facilitates leaching copper from the copper-containing material, and
       wherein the microbes oxidize ferrous iron to ferric iron.

15. A method of removing copper from a low-grade copper-containing material having copper sulfide minerals comprising:

(a) obtaining a pyrite-containing slurry from a tailings dam or directly from a tailings stream of an ore processing plant;
(b) removing pyrite from the pyrite-containing slurry by the steps of separating larger particles from the remaining pyrite-containing slurry, reducing the size of the larger particles in a size reduction circuit and returning the reduced-sized particles to the size separation step, and floating pyrite-containing particles in the remaining slurry and forming (i) an inert stream and (ii) a pyrite-containing material, including selecting operating conditions so that pyrite particles have a required particle size distribution for leaching step (d);
(c) mixing a low-grade copper-containing material having copper sulfide minerals and the pyrite-containing material and forming agglomerates, and
(d) leaching copper from the copper-containing material in the agglomerates from step (c) with a leach liquor and microbes,
    wherein the pyrite in the pyrite-containing material generates acid and heat that facilitates leaching copper from the copper-containing material, and
wherein the microbes oxidize ferrous iron to ferric iron.

\* \* \* \* \*